United States Patent [19]

Mick

[11] Patent Number: 4,519,468

[45] Date of Patent: May 28, 1985

[54] STEERABLE CARROUSEL SUPPORTED WALKING BEAM VEHICLE

[75] Inventor: Jon L. Mick, Cedar Rapids, Iowa

[73] Assignee: FMC Corporation, Chicago, Ill.

[21] Appl. No.: 478,195

[22] Filed: Mar. 24, 1983

[51] Int. Cl.³ .............................................. B62D 57/02
[52] U.S. Cl. .................................................... 180/8.5
[58] Field of Search ......................... 180/8.5, 8.1, 8.6; 305/1

[56] References Cited

U.S. PATENT DOCUMENTS

| | | | |
|---|---|---|---|
| 2,132,184 | 10/1938 | Poche | 180/8.5 |
| 2,452,632 | 11/1948 | Cameron | 37/116 |
| 2,660,253 | 11/1953 | Davidson | 180/8.5 |
| 2,972,199 | 2/1961 | Learmont | 37/116 |
| 3,265,145 | 8/1966 | Beitzel | 180/8.5 |
| 3,375,892 | 4/1968 | Kraschnewski et al. | 180/8.5 |

FOREIGN PATENT DOCUMENTS 653353 3/1979 U.S.S.R. .............................. 180/8.5

Primary Examiner—John A. Pekar
Attorney, Agent, or Firm—A. J. Moore; H. M. Stanley; R. B. Megley

[57] ABSTRACT

A walking beam vehicle is disclosed for supporting a crane or the like which reduces power requirements relative to prior art vehicles. A bi-functional swing drive system is provided for either pivoting the walking beams and a lower frame relative to an upper frame and the ground, or pivoting the upper frame relative to the walking beams and the ground. A power operated lift pad is provided for alternately raising the lift pad and walking beam from the ground. When the vehicle is used as a crane or the like, the walking beams may be extended toward a heavy load to be lifted in order to minimize rollover tendencies of the crane.

5 Claims, 6 Drawing Figures

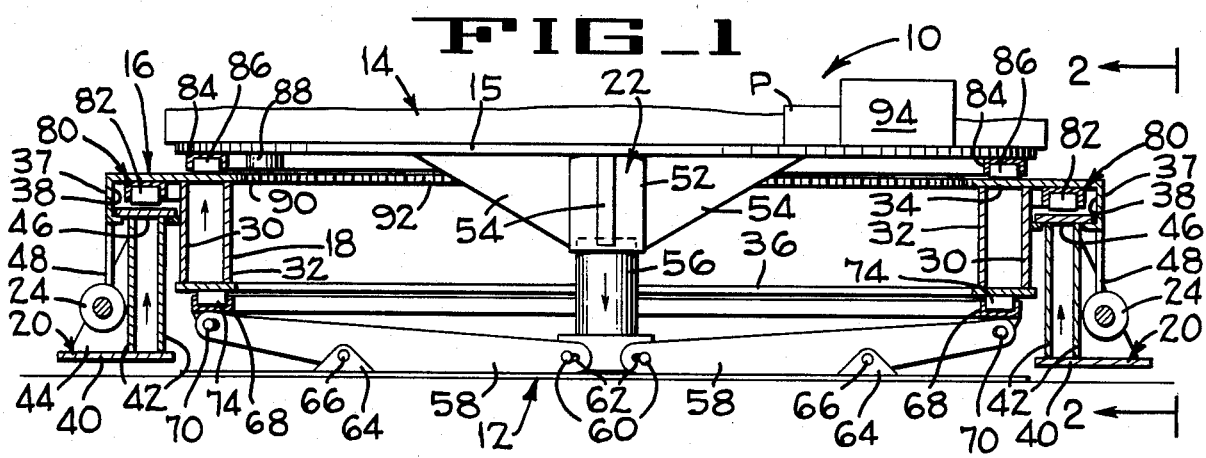
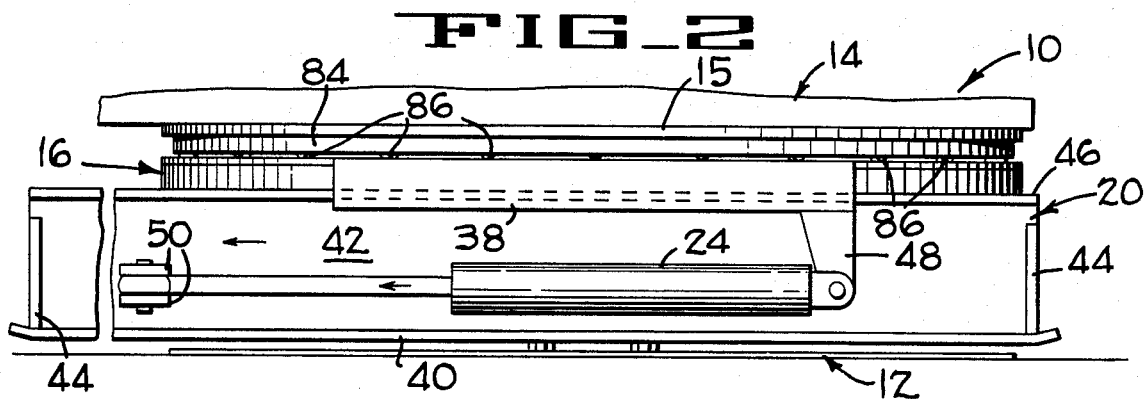
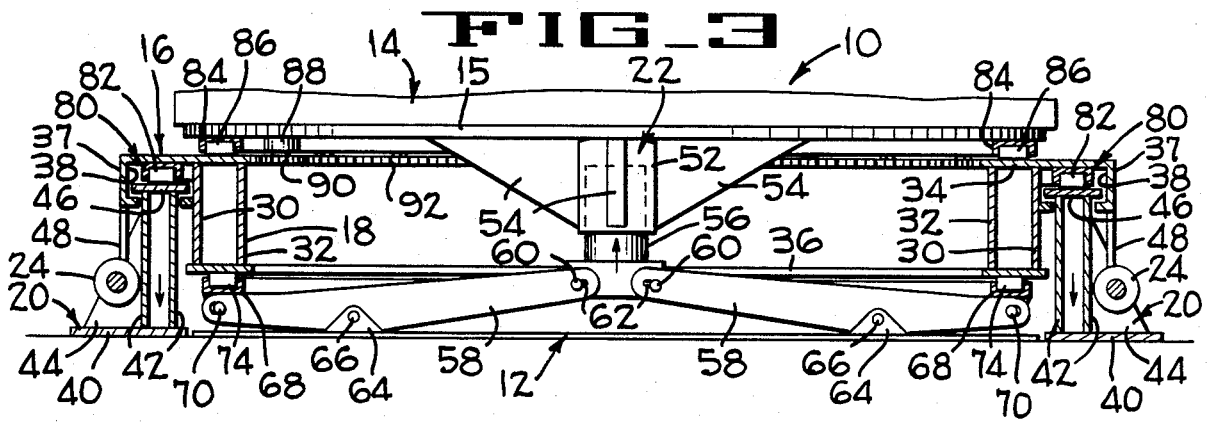
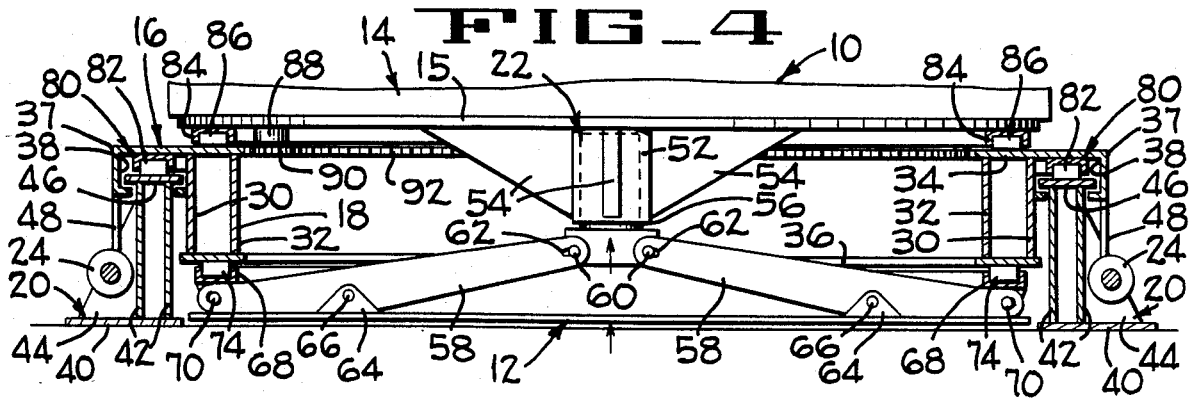

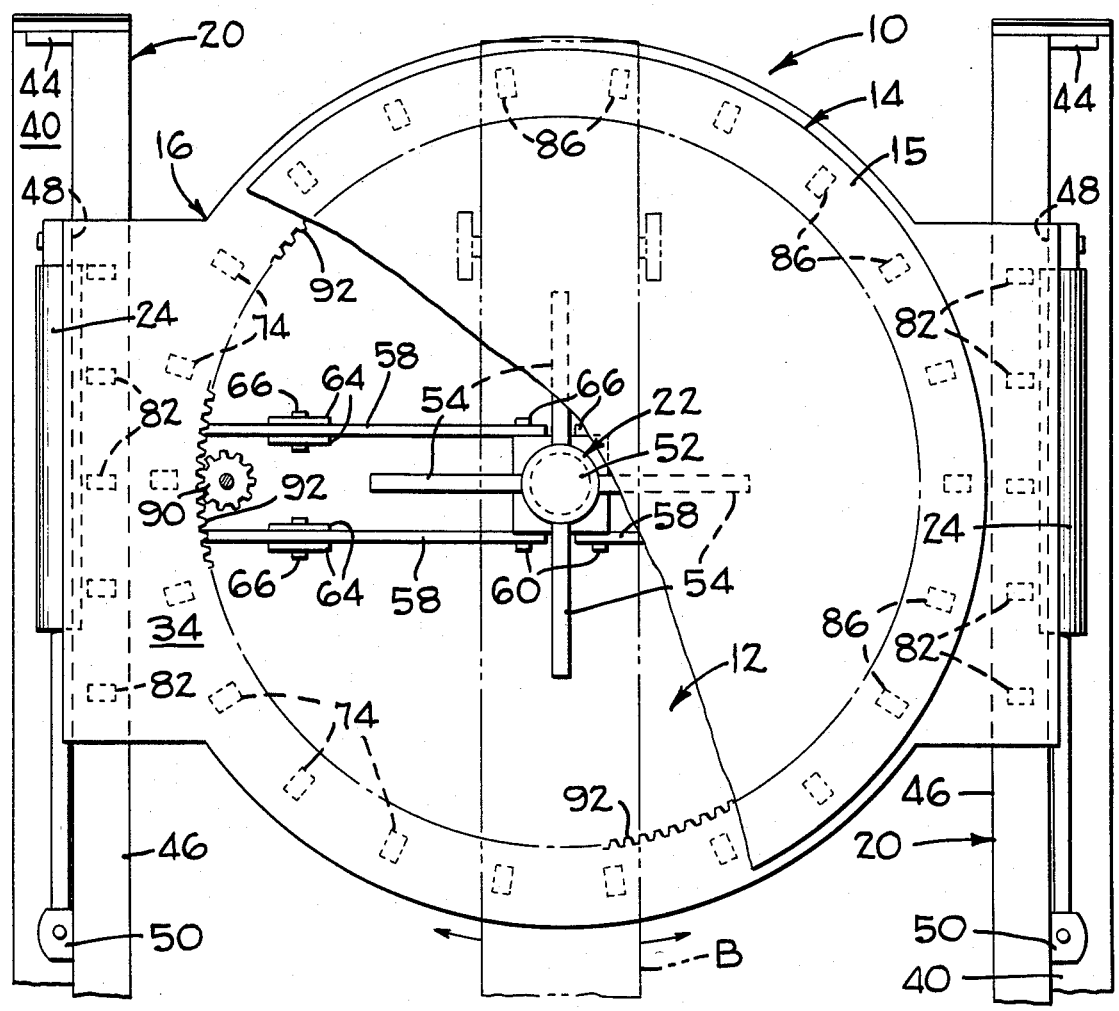
FIG_5
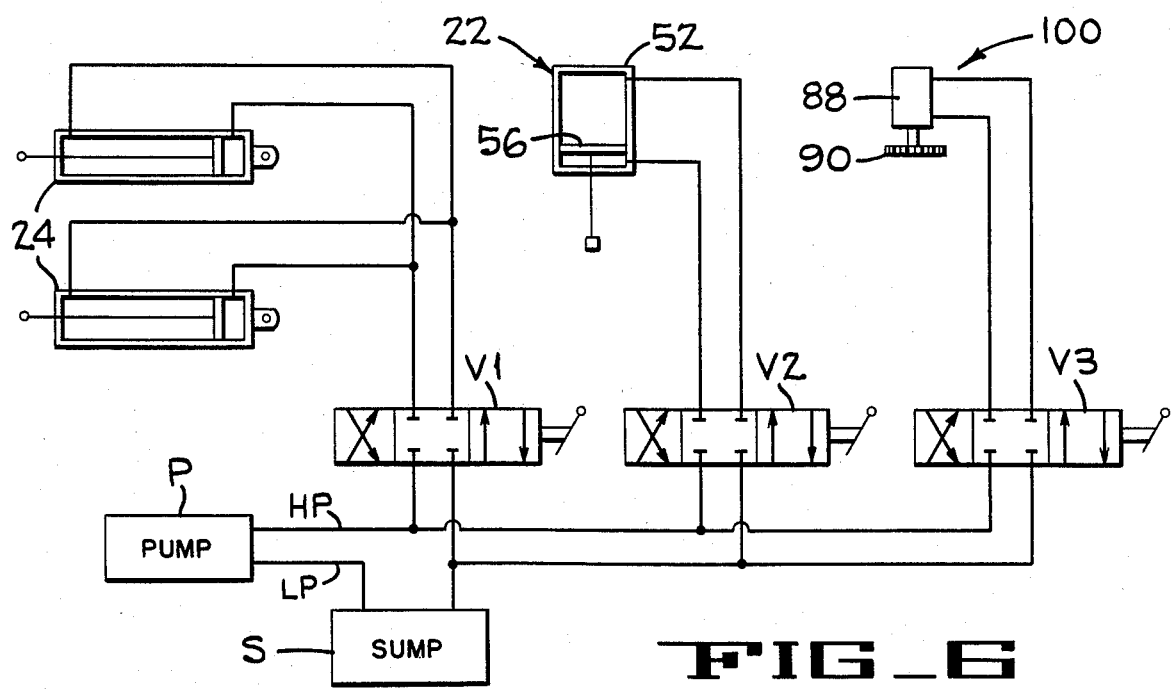
FIG_6

STEERABLE CARROUSEL SUPPORTED WALKING BEAM VEHICLE

REFERENCE TO RELATED APPLICATIONS

The present invention is pertinent to the inventions disclosed in the following copending applications assigned to the assignee of the present invention and are filed on even date herewith.

Wolf application Ser. No. 478,194 entitled Load Supporting Structure.

Mick et al. application Ser. No. 478,193 entitled Heavy Lift Transi-Crane.

BACKGROUND OF THE INVENTION

1. Field of the Invention

The present invention relates to a steerable walking beam vehicle for transporting mechanisms such as cranes and excavators or the like to different locations.

2. Description of the Prior Art

Large mobile vehicles such as cranes or the like have usually used crawler track mechanisms to move the vehicles from place to place. However, the complexity and large number of moving parts in crawler track mechanisms have high fabrication and assembly costs and require frequent and costly maintenance. Additionally, the track skidding principle employed by the crawler track mechanisms for the purpose of steering, requires that much more power be available to overcome the frictional forces associated with skidding than is required for simple straight line travel.

U.S. patents to Cameron U.S. Pat. No. 2,452,632; Beitzel U.S. Pat. No. 3,265,145 and Kraschnewski et al U.S. Pat. No. 3,375,892 disclose several variations of walking beam type vehicles.

SUMMARY OF THE INVENTION

The apparatus of the present invention provides a vehicle of the walking beam type capable of supporting a crane or the like that is simple to manufacture and maintain and has the ability to provide steerable travel without the encumbrance of friction due to skidding. The apparatus also features a bifunctional swing drive system that provides either rotation of the walking beams relative to an upper support or rotation of the upper support relative to the walking beams. The vehicle also includes roller bearings between mating components for minimizing power requirements to walk the vehicle and to pivot the walking beams or upper support relative to each other.

BRIEF DESCRIPTION OF THE DRAWINGS

FIG. 1 is an end elevation of the walking beam vehicle of the present invention with the walking beams being spaced from the ground, certain parts being cut away and others being shown in central vertical section.

FIG. 2 is a side elevation of the vehicle taken looking in the direction of arrows 2—2 of FIG. 1 illustrating one of the walking beams fully extended to the left with a portion thereof being cut away.

FIG. 3 is an end elevation similar to FIG. 1 but with the vehicle being supported by the beams and also by a lift pad.

FIG. 4 is a section similar to FIG. 1 but with the lift pad raised clear of the ground.

FIG. 5 is a diagrammatic plan with parts removed illustrating different components of the vehicle.

FIG. 6 is a simplified hydraulic circuit which may be used to operate different components of the vehicle.

DESCRIPTION OF THE PREFERRED EMBODIMENT

In general, the steerable walking beam vehicle 10 (FIGS. 1-5) of the present invention comprises a large diameter disc or lift pad 12; an upper support frame 14 illustrated as including a circular plate 15 for supporting a mechanism such as a crane (not shown); a carrousel frame 16 in the form of a rigid box beam ring 18 which movably carries a pair of diametrically opposed walking beams 20; power means such as a hydraulic lift ram 22 disposed between the support frame 14 and the lift pad 12 for alternately raising the lift pad 12 and walking beams 20 clear of the ground; and a pair of walking beam hydraulic rams 24 for moving the walking beams 20 relative to the carrousel frame.

More particularly, the carrousel frame 16 is of rigid welded construction and includes a pair of opposed vertical walls 30,32 and horizontal walls 34,36 which define the box beam ring 18. Opposed portions of the upper horizontal wall 34 extend outwardly of the ring 18 as best shown in FIG. 5, and include downwardly extending skirts 37 (FIG. 1) and inwardly extending lips which cooperate with other lips secured to the wall 30 to define two horizontal linear guideways 38 for the associated walking beams 20.

Each walking beam 20 includes a ground contacting plate 40, a pair of vertical plates 42, gusset plates 44 and a top plate 46 slidably received in the associated guideway 38. The several components of each walking beam 20 are rigidly secured together as by welding.

As best shown in FIG. 2, the hydraulic rams 24 each have their cases pivotally connected to a bracket 48 welded to the external surface of the associated guideway 38, and has its piston rod pivotally connected to a yoke 50 secured to the associated walking beam 20.

The hydraulic lift ram 22 has its cylinder 52 rigidly secured to the circular plate 15 of the support frame 14 and to at least two gussets 54 projecting downwardly from the plate 15. The piston 56 of the lift ram 22 projects downwardly from the cylinder and has its lower end movably connected to inner end portions of lift beams 58 by pivot pins 60 and slots 62. The lift beams 58 are pivoted to the lift pad 12 by yoke 64 and pivot pin 66. The outer ends of the lift beams 58 are similarly pivotally connected to an annular channel 68 by yokes and pivot pins 70 which extend through slots in the beam 58. The annular channel 68 rotatably supports a plurality of rollers 74 which engage the lower horizontal wall 36 of the carrousel frame 16 to support the carrousel frame and components thereon when the walking beams 20 are raised above the ground as illustrated in FIGS. 1 and 2. Although only two lift beams 58 are illustrated in the drawings, it will be understood that additional lift beams may be used if desired.

It will be noted that the lower inner portions of the arms 58 (FIG. 1) and the lower end of the piston 56 engage the upper surface of the lift pad 12 when the walking beams are lifted from the ground thus distributing the lifting forces outwardly from the vertical axis of the vehicle 10. As shown in FIG. 4, the outer end portions of the arms engage the upper surface of lift pad 12 to first terminate pivotal movement of the arms 58 and then raising the lift pad free of the ground.

A linear channel 80 is secured to the inner surface of portions of each wall 34 disposed above the walking beam 20 and rotatably supports a plurality of rollers 82 within the guideway 38. The rollers 82 engage the upper surface of the associated walking beams 20 when the vehicle 10 is partially or fully supported by the walking beams as illustrated in FIGS. 3 and 4.

An annular channel 84 is secured to the plate 15 of the support frame 14 and has a plurality of rollers 86 rotatably supported therein, which rollers engage the upper horizontal wall 34 of the carrousel frame 16. Power means such as a hydraulic motor 88 is secured to the plate 15 and has a gear 90 secured to its output shaft which meshes with an internal ring gear 92 on the carrousel frame 16 for establishing relative rotation between the carrousel frame 16, and the support frame 14 and lift pad 12 as a unit.

An engine 94 and hydraulic pump P provide power to the lift ram 22, the walking beam rams 24, and the hydraulic motor 88 through a suitable hydraulic control system 100 (FIG. 6) which includes a conventional rotary swivel joint (not shown) and a plurality of operator controlled valves.

The hydraulic control system 100 includes the pump P and a sump S, a control valve V1 for controlling the walking beam rams 24, a control valve V2 for controlling the hydraulic lift ram 22, and a control valve V3 for controlling the hydraulic motor 88.

In operation, and when the vehicle 10 is positioned with its walking beams 20 parallel to the desired direction of travel and with the beams 20 elevated from the ground as indicated in FIG. 1, the operator shifts valve V1 (FIG. 6) to its parallel passage position thereby fully extending the walking beam rams 24 as indicated in FIG. 2. The valve V1 is then returned to the illustrated neutral position and the valve V2 is moved to its parallel passage position thereby lifting the piston 56 which raises the lifting pad 12 and, accordingly, lowers the walking beams 20 onto the ground as best shown in FIG. 4. Thus, the beams 20 support the vehicle 10. When the operator shifts valve V1 to its cross passage position, the piston rods in the walking beam rams 24 retract thereby moving the vehicle one step forward. The operator then shifts the valve V2 to its cross passage position thereby lowering the piston 56 and lift pad 12 to again raise the walking beams 20 above the ground so that the beams can be moved forward by the rams 24 by shifting the valve V1 into its parallel passage position thus returning the beams to the starting position illustrated in FIG. 2. The above described procedure is repeated until the vehicle is intermittently walked to its desired location. It will be noted that when the vehicle is supported by the walking beams 20, support of the carrousel frame 16, and the components thereon, is through the roller bearings 82 as best shown in FIG. 4 thus minimizing the force necessary to walk the vehicle forward or rearward.

It is also apparent that the vehicle may be walked in a reverse direction, i.e., downwardly in FIG. 5, by altering the procedure so that the rams 24 are retracted when the walking beams 20 are lifted off the ground and are extended when the beams 20 are supporting the vehicle. It will further be noted that the lift beams 58 exert a downward force to the lifting pad 12 at points directly below the lifting ram 22 as well as points extending outwardly therefrom due to the outward location of the pivot pins 66. In the event a crane is mounted on the support frame 14, and that arcuate movement is not required during transfer of the load, the vehicle may be supported by both of the walking beams 20 and the lifting pad 12 as shown in FIG. 3.

When it is desired to pivot the support frame 14 and a crane boom B (FIG. 5) or the like relative to the walking beams 20 about the axis of the lift ram 22, the lift pad 12 is raised from the ground as indicated in FIG. 4. The valve V3 is moved to the parallel passage position for driving the motor 88 thereby pivoting the support frame 14 in one direction; and is positioned in the cross-passage position to drive the motor 88 in the opposite direction thereby pivoting the support frame 14 in the opposite direction.

When it is desired to pivot the walking beam 20 and the carrousel frame 16 relative to the support frame 14 and the lift pad 12, the walking beams 20 are first raised above the ground as above described. The valve V3 is then moved to the parallel passage position or the cross passage position to pivot the carrousel frame 16 and the beams 20 in a selected direction thereby changing the direction of movement of the vehicle 10 by the walking beam rams 24.

From the foregoing description it is apparent that the walking beam vehicle of the present invention includes a functional swing drive system which requires a minimum of power for pivoting the walking beam relative to an upper support or pivots the upper support relative to the walking beam. The vehicle design is simple to manufacture and maintains and substantially reduces power requirements as compared to tracked vehicles.

Although the best mode contemplated for carrying out the present invention has been herein shown and described, it will be apparent that modification and variation may be made without departing from what is regarded to be the subject matter of the invention.

I claim:

1. A ground supported multi-directional walking beam vehicle comprising: upper and lower frame means; means connecting said frame means together for relative pivotal movement about a vertical axis; means defining walking beams mounted on said lower frame on opposite sides of said axis for horizontal reciprocal movement; frame lifting means operatively connected to both of said frame means and movable between a first position supported on the ground and lifting the beams from the ground, and a second position lowering said beams onto the ground with the frame being supported by the beams and lifting said lifting means from the ground; means for pivoting one of said frame means relative to the ground when the frame means are supported by said beams, and for pivoting said other frame means relative to the ground when said frame means are supported by said lifting means; and means for moving said beams along parallel paths in one direction when spaced from the ground and in the opposite direction when supported on the ground for moving the frames along a linear path; said lifting means comprises a lift cylinder secured to said upper frame and being concentric with said axis, a piston projecting downwardly from said cylinder, a plurality of lift arms with one end of each arm movably connected to said piston and the other end of each arm movably connected to said lower frame, means defining a ground engaging lift pad, and means for movably connecting intermediate portions of said lift arms to said pad means for moving said pad means into vehicle supporting position in response to extension of said piston and for raising said pad means off the ground in response to retraction of said piston.

2. A ground supported multi-directional walking beam vehicle comprising: upper and lower frame means; means connecting said frames together for relative pivotal movement about a vertical axis; means defining walking beams mounted on said lower frame on opposite sides of said axis for horizontal reciprocal movement; frame lifting means interposed between one of said frames and the ground and movable between a lowered position for lifting the beams from the ground and a raised position disposed above the ground with the frames being supported by the beams; means for pivoting the upper frame relative to the ground when the frames are supported by said beams, and for pivoting said lower frame relative to the ground when said frames are supported by said lifting means; and means for moving said beams along parallel horizontal paths in one direction when spaced from the ground and in the opposite direction when supported on the ground for moving the frames along a linear path; said lower frame includes an annular frame portion, and wherein said lifting means comprises a lift cylinder secured to the upper frame and being concentric with said axis, a piston projecting downwardly from said cylinder, a plurality of lift arms with one end of each arm movably connected to said piston and the other end of each arm movably connected to said lower frame, means defining a ground engaging lift pad, and means for movably connecting intermediate portions of said lift arms to said pad means for moving said pad means into vehicle supporting position in response to extension of said piston and for raising said pad means off the ground in response to retraction of said piston.

3. A multi-directional walking beam vehicle with relatively movable frame components movable along linear paths on the ground comprising: means defining an upper frame; means defining a lower frame supporting said upper frame for pivotal movement about a vertical axis; means defining walking beams movably supported by said annular frame on opposite sides thereof; frame lifting power means operatively connected to at least one of said frames for movement between a first position spaced above the ground with said walking beams supporting said frames from the ground, and a second position contacting the ground and lifting said walking beams above the ground; beam reciprocating power means on said lower frame for moving said beams along parallel horizontal paths; frame pivoting power means for pivoting said upper and lower means relative to each other about said vertical axis; and selectively operable control means for alternately activating said frame lifting power means and said reciprocating power means to drive said beams in one direction when spaced from the ground and in the opposite direction when supported on the ground for moving the vehicle along a linear path; said control means also being selectively operable to activate said pivoting power means for pivoting said beams in selected directions about said vertical axis and relative to the ground to change the angular direction of travel of the vehicle when the beams are spaced from the ground, and to pivot the upper frame relative to the lower frame in selected directions when the beams are supported on the ground; said lower frame includes an annular frame portion, and wherein said lifting means comprises a lift cylinder secured to the upper frame and being concentric with said axis, a piston projecting downwardly from said cylinder, a plurality of lift arms with one end of each arm movably connected to said piston and the other end of each arm movably connected to said lower frame, means defining a ground engaging lift pad, and means for movably connecting intermediate portions of said lift arms to said pad means for moving said pad means into vehicle supporting position in response to extension of said piston and for raising said pad means off the ground in response to retraction of said piston.

4. An apparatus according to claim 3 and additionally comprising an annular bearing support secured to said other end of said arms, and rotatable lift bearing means disposed in said bearing support and operatively engaging said lower frame.

5. An apparatus according to claim 4 and additionally comprising first rotatable bearings disposed between said beams and said lower frame, and second rotatable bearings disposed between said upper frame and said lower frame.

* * * * *